United States Patent
Montgomery et al.

(10) Patent No.: US 7,127,605 B1
(45) Date of Patent: Oct. 24, 2006

(54) SECURE SHARING OF APPLICATION METHODS ON A MICROCONTROLLER

(75) Inventors: Michael A. Montgomery, Cedar Park, TX (US); Ksheerabdhi Krishna, Cedar Park, TX (US)

(73) Assignee: Axalto, Inc., Austin, TX (US)

( * ) Notice: Subject to any disclaimer, the term of this patent is extended or adjusted under 35 U.S.C. 154(b) by 0 days.

(21) Appl. No.: 09/568,401

(22) Filed: May 10, 2000

Related U.S. Application Data

(60) Provisional application No. 60/133,300, filed on May 10, 1999.

(51) Int. Cl.
*H04L 9/00* (2006.01)

(52) U.S. Cl. ............ 713/150; 709/100; 713/150; 713/170; 713/192; 713/280; 380/30; 380/280

(58) Field of Classification Search ........... 709/1, 709/100; 705/35, 39, 41, 44; 717/114, 118; 713/200–202, 150, 170, 192, 280; 718/1; 719/313–316; 380/30, 280
See application file for complete search history.

(56) References Cited

U.S. PATENT DOCUMENTS

| | | | | |
|---|---|---|---|---|
| 5,007,089 A | * | 4/1991 | Matyas et al. | 380/280 |
| 5,164,988 A | * | 11/1992 | Matyas et al. | 713/156 |
| 5,883,956 A | * | 3/1999 | Le et al. | 713/170 |
| 5,889,866 A | * | 3/1999 | Cyras et al. | 713/192 |
| 6,005,942 A | * | 12/1999 | Chan et al. | 713/187 |
| 6,038,551 A | * | 3/2000 | Barlow et al. | 705/41 |
| 6,134,327 A | * | 10/2000 | Van Oorschot | 380/30 |
| 6,141,752 A | * | 10/2000 | Dancs et al. | 713/172 |
| 6,185,730 B1 | * | 2/2001 | LeBlanc | 717/108 |
| 6,216,227 B1 | * | 4/2001 | Goldstein et al. | 713/172 |
| 6,220,510 B1 | * | 4/2001 | Everett et al. | 235/380 |
| 6,233,683 B1 | * | 5/2001 | Chan et al. | 713/172 |
| 6,308,317 B1 | * | 10/2001 | Wilkinson et al. | 717/139 |
| 6,330,689 B1 | * | 12/2001 | Jin et al. | 714/15 |
| 6,401,208 B1 | * | 6/2002 | Davis et al. | 713/193 |
| 6,481,621 B1 | * | 11/2002 | Herrendoerfer et al. | 235/380 |

OTHER PUBLICATIONS

Abadi et al. "A Calculus For Access Control In Distributed Systems", ACM Transactions On Programming Languages and Systems (TOPLAS), vol. 15, Issue 4 (Sep. 1993), pp. 706-734.*

(Continued)

*Primary Examiner*—Chun Cao
*Assistant Examiner*—Sean Weinman
(74) *Attorney, Agent, or Firm*—Pehr Jansson; Anderson & Jansson LLP

(57) ABSTRACT

A method and microcontroller for secure object sharing between applications executing on the microcontroller. A server application registers a delegate object with the operating system of the microcontroller. The delegate object permits access to the public interfaces of the server while enforcing security policies.

15 Claims, 7 Drawing Sheets

OTHER PUBLICATIONS

Raiha, Liisa. "Delegation: Dynamic Specialization", Annual International Conference on Ada—Proceedings of the Conference on TRI-Ada (1994), pp. 172-179.*

Abadi et al. "Authentication and Delegation with Smart-Cards", Theoretical Aspects of Computer Software, Springer-Verlag Lecture Notes in Computer Science 526 (Sep. 1991), pp. 326-345.*

Thomas Y.C. Woo and Simon S. Lam, "Designing a Distributed Authorization Service". IEEE INFOCOM '98, San Francisco, Mar. 1998. http://citeseer.ist.psu.edu/article/woo98designing.html.*

Thomas Y.C Woo and Simon S. Lam, Designing an Authorization Service. Technical Report TR 93-29, Department of Computer Science, The University of Texas at Austin, Sep. 1993. http://citeseer.ist.psu.edu/woo94designing.html.*

"Java Card 2.1 Runtime Environment (JCRE) Specification," Sun Microsystems, Inc., Palo Alto, Ca, Final Revision 1.1, Jun. 7, 1999, pp. 1-57.

"Java Card 2.1 Application Programming Interface," Sun Microsystems, Inc., Palo Alto, CA, Final Revision 1.1, Jun. 7, 1999, pp. 1-210.

"Java Card 2.1 Virtual Machine Specification," Sun Microsystems, Inc., Palo Alto, CA, Final Revision 1.1, Jun. 7, 1999, pp. 1-266.

* cited by examiner

SECURE SHARING OF APPLICATION METHODS ON A MICROCONTROLLER

This application claims the benefit of U.S. provisional application No. 60/133,300 filed on May 10, 1999.

Background of the Invention

This invention relates in general to the field of programming, and more particularly to a secure method of sharing application methods between two or more application programs executing on a secure microcontroller (e.g., smart card) programmed in a high level programming language.

Software applications written for smart cards using a high level programming language are typically prevented by the smart card security system from accessing the data and methods associated with other applications. However, it is desirable to permit certain applications to access particular methods of other applications. For example, a distributor of an electronic purse might have an agreement with a certain airline to grant frequent flier points based on the amount purchased. In that example, the purse application might want to check to see whether a frequent flier loyalty application is loaded onto the smart card, and if so, to access a method of the loyalty application in order to grant points.

There exist in the prior art solutions for sharing application methods with other applications. For example, the Java Card 2.1 specification uses shareable interface objects (because of its wide adoption, the Java Card 2.1 approach to method sharing is referred hereinafter as the "Conventional Approach"). However, the prior art methods, for example, the Conventional Approach, suffer from several drawbacks.

First, when an application grants another application access to its methods, it grants access to all of the shareable methods of a class. Suppose a server applet (application which extends the applet class) has two interfaces on the same class, intended for different kinds of clients. If a client has been granted one interface, in the prior art the server has no way to prevent the other interface from being used as well, giving the client access to unintended methods.

This kind of security compromise is illustrated in Appendix A. Code 1 is an example of a server code, and Code 2 is a code example of a client obtaining and misusing a reference to that server. Once a client has been granted access to any interface, it is possible for that client to access all of the shareable interface methods of an object by explicitly re-casting an interface the client is supposed to be granted access to into an interface that the client is not supposed to have access to. So if a server applet has two interfaces, intended for different kinds of clients, a client who legitimately obtains one interface, could cast it into the other interface, and gain access to unintended methods.

Code segments Code 1 and Code 2 of Appendix A illustrate the above described security risk inherent to the Conventional Approach.

For example, consider an applet ABCLoyaltyApplet that has two different services that it intends to offer exclusively to two different clients, e.g., grantFrequentFlyerPoints for client Airline, and grantLoyaltyPoints for client Purse. Both of these services are accessible to respective clients via different published interfaces, but both are defined in the Applet class ABCLoyaltyApplet, as illustrated in Code 1 in Appendix A.

If the Purse client was aware of the Airline client interface, the Purse client could take the interface it had been granted by the server applet to grant loyalty points, and recast it as the Airline client interface. The Purse client could then use the grantFrequentFlyerPoints interface (intended for client Airline) to maliciously add unwarranted frequent flier points, as shown in Code 2 in Appendix A. Thus the security of the server has been compromised.

A second drawback is based on the method of client authentication. The decision by a server applet to grant access to an object must be based solely on the application identifier (AID) of the requesting applet; no other information is available to the server applet. The intended use is clearly to allow certain interfaces to be granted only to particular client applets, as denoted by their unique AIDs. However, it is possible to maliciously set the AID of a rogue applet to be the same as the AID of a client applet known to have access to a particular interface. The rogue applet is then loaded instead of the applet that legitimately owns the AID. Once loaded, the rogue applet can request the desired interface. The server applet, having only the AID for reference, will naturally grant this request, since the AID matches the required AID for the interface. The rogue applet can then freely use the interface for malicious purposes, again compromising the security of the server application.

A third drawback also results from the method of providing method sharing by client AID authentication. Granting access based on AID necessarily assumes that the server applet that wishes to share the object has knowledge of all AIDs of all client applets that could potentially be loaded which will share particular interfaces. Requiring the server application to have knowledge of all potential client AIDs precludes adding additional client applets after the server has been loaded. Such future applets are excluded from access to the object, since the server can only grant access based on the AID list that the server had when it was loaded. That deficiency necessitates rewriting and reissuing the server applet such that the new AIDs are included, which may pose an insurmountable hurdle when the server applet is already widely distributed.

These drawbacks form a formidable obstacle to the use of object sharing in smart cards. For object sharing to truly be practical, these obstacles must be overcome.

SUMMARY OF THE INVENTION

The method, microcontroller, and system of the present invention provide for secure object sharing between microcontroller applications while overcoming the aforementioned deficiencies.

The invention features a secure microcontroller (e.g., a contact or contactless smart card in any form factor) that is constructed to execute applications written in a high level programming language (e.g., a Java programming language) using an interpreter, the applications being able to share methods in a secure manner using delegates to enforce the security policy that each application wishes to impose with regard to each method shared.

Among the advantages of the invention are one or more of the following. Applications may be written to share methods with other applications using the degree of security required in each instance; applications have the freedom to implement whatever security policy is deemed necessary for each method, ranging from full unrestricted access to certain methods by any application, to the opposite extreme of strong cryptographic mutual validation to access other methods. Applications using this invention are able to share methods with future applications that may have not yet even been considered. Applications grant access to their methods on an individual basis to other applications; each method could be permitted to be accessed by applications based on different criteria, providing maximum granularity of access control. Applications need not be susceptible to fraudulent access based on application identifier impersonation. Such applications need not grant access to all public methods of a class.

Other advantages and features will become apparent from the following description and from the claims.

DETAILED DESCRIPTION OF THE PREFERRED EMBODIMENTS

Figure 1:
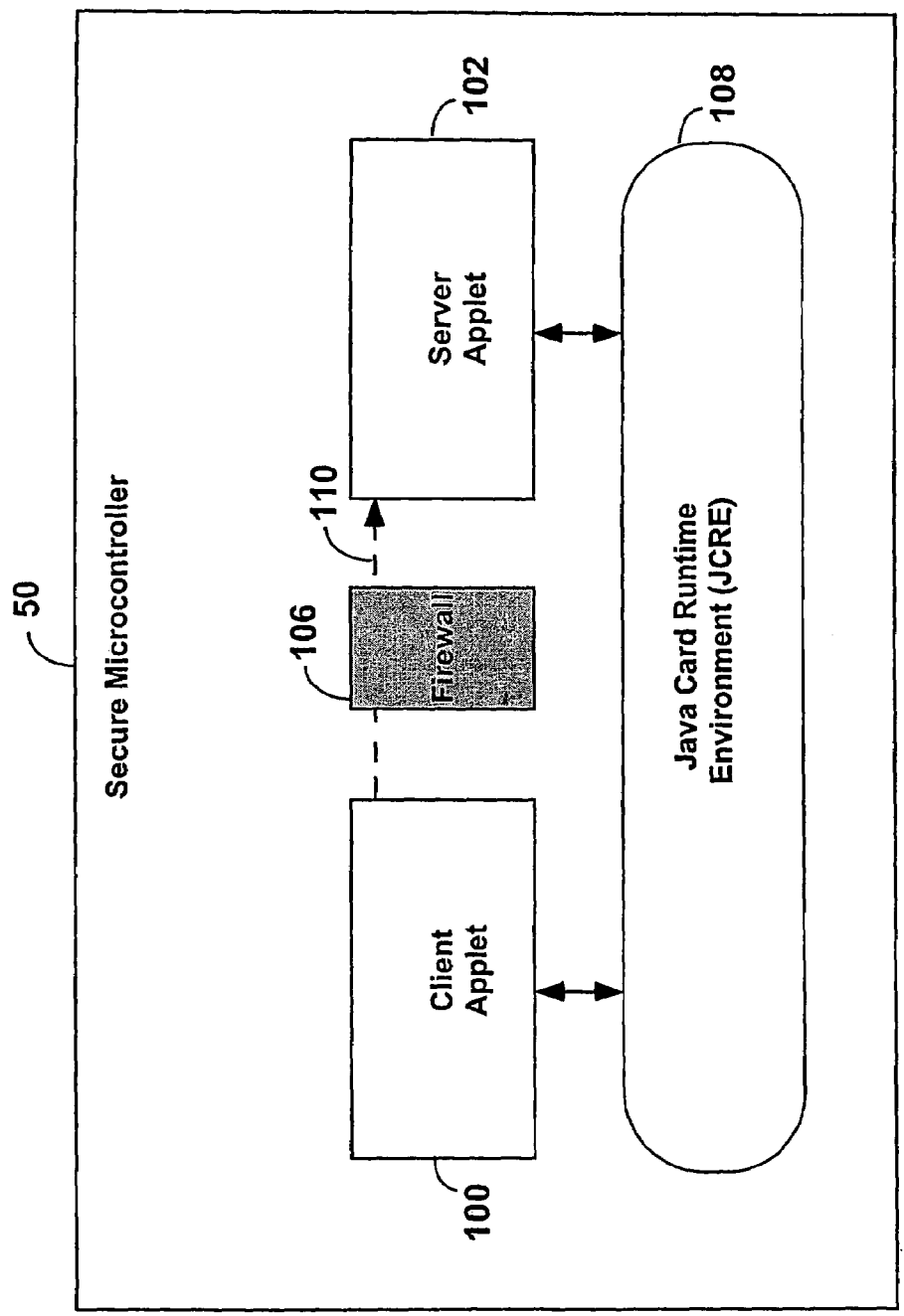
FIG. 1 is a block diagram illustrating the firewall between applications on a smart card.

FIG. 1 is a block diagram of a microcontroller. A secure microcontroller 50 (e.g., a smart card) is constructed to provide a high level language, multiple application programming and execution environment. The secure microcontroller 50 comprises a client applet 100, a server applet 102, a firewall 106 between the client applet 100 and the server applet 102, and a Java Card Runtime Environment (JCRE) 108. (In a preferred embodiment for this invention client and server applications are written in Java. However, the invention is applicable to other programming languages including, but not limited to, Visual Basic and C++.) The client applet 100 and the server applet 102 may freely communicate with the JCRE 108, but the client applet 100 is prevented from referencing 110 the server applet 102 by the firewall 106 to ensure security.

Figure 2A:
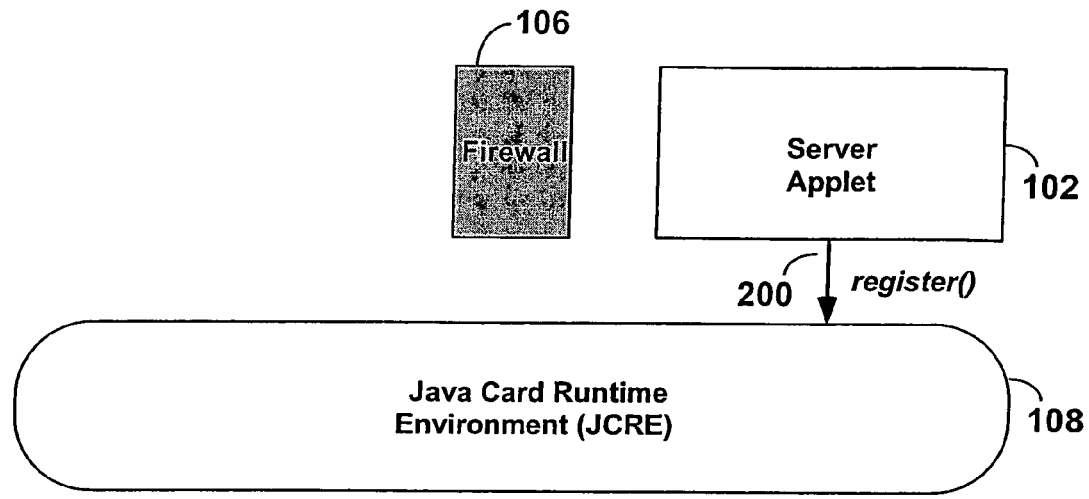
FIG. 2 is a series of block diagrams illustrating how a conventional Java Card permits object sharing using shareable interface objects.
Figure 2B:
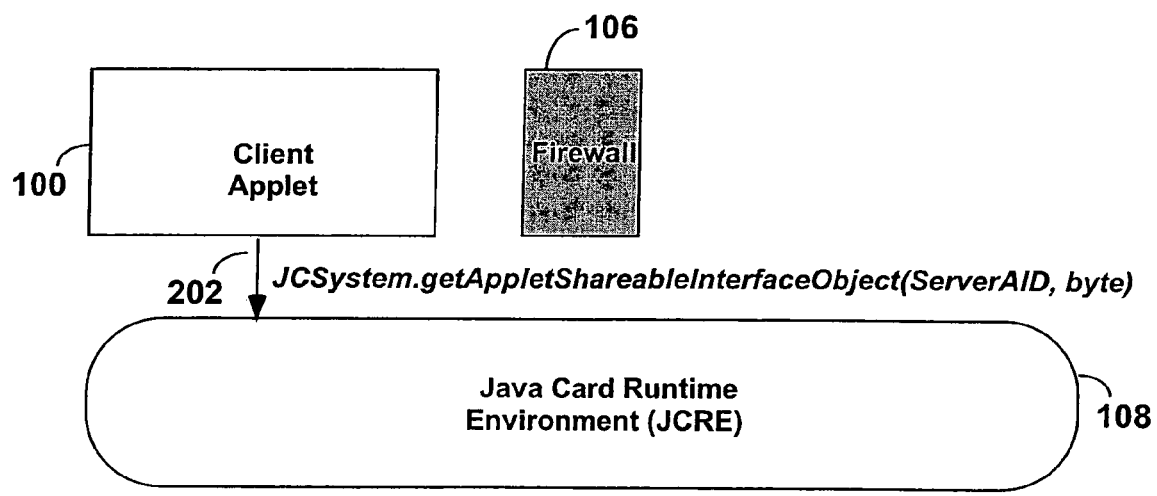
Figure 2C:
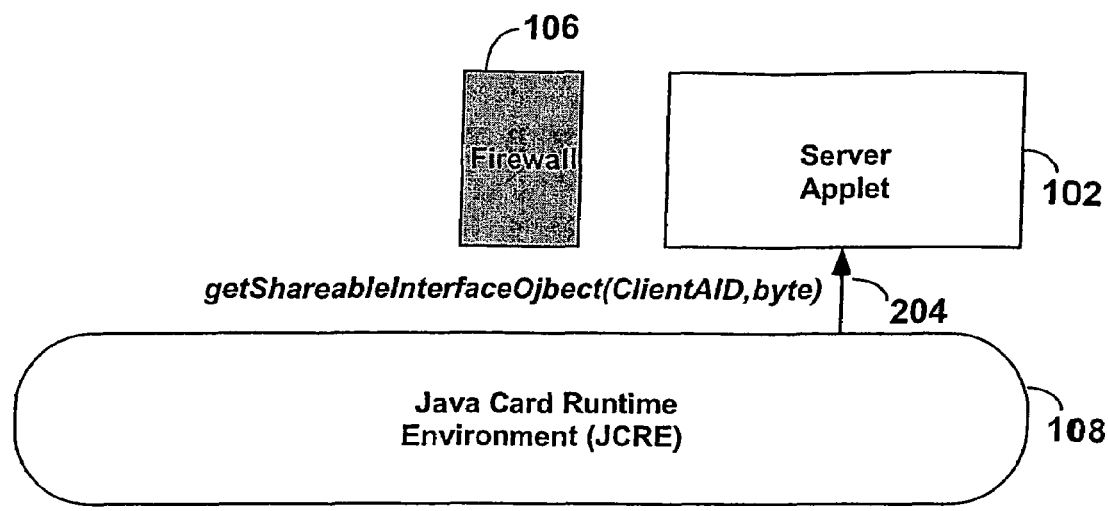
Figure 2D:
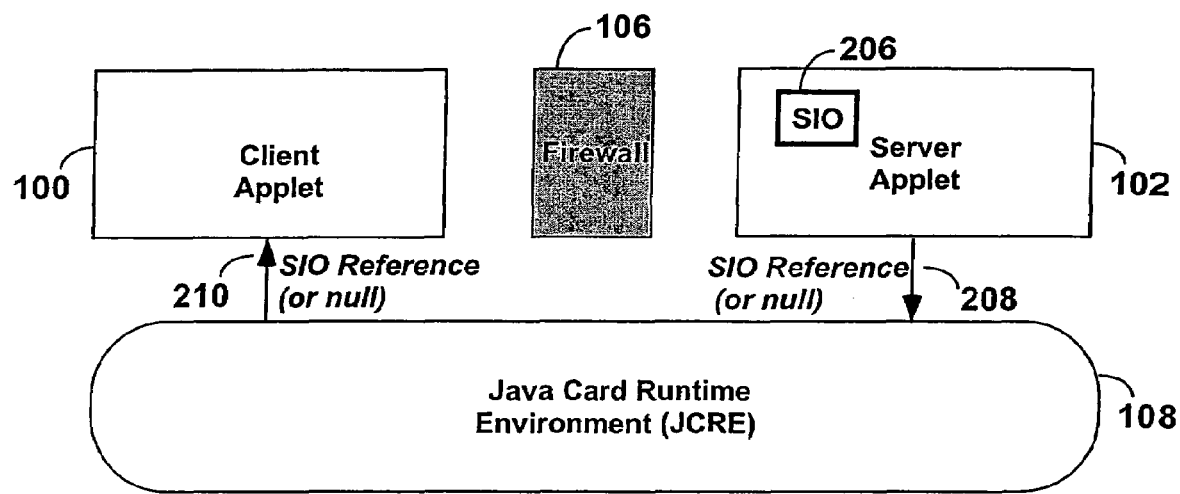
Figure 2E:
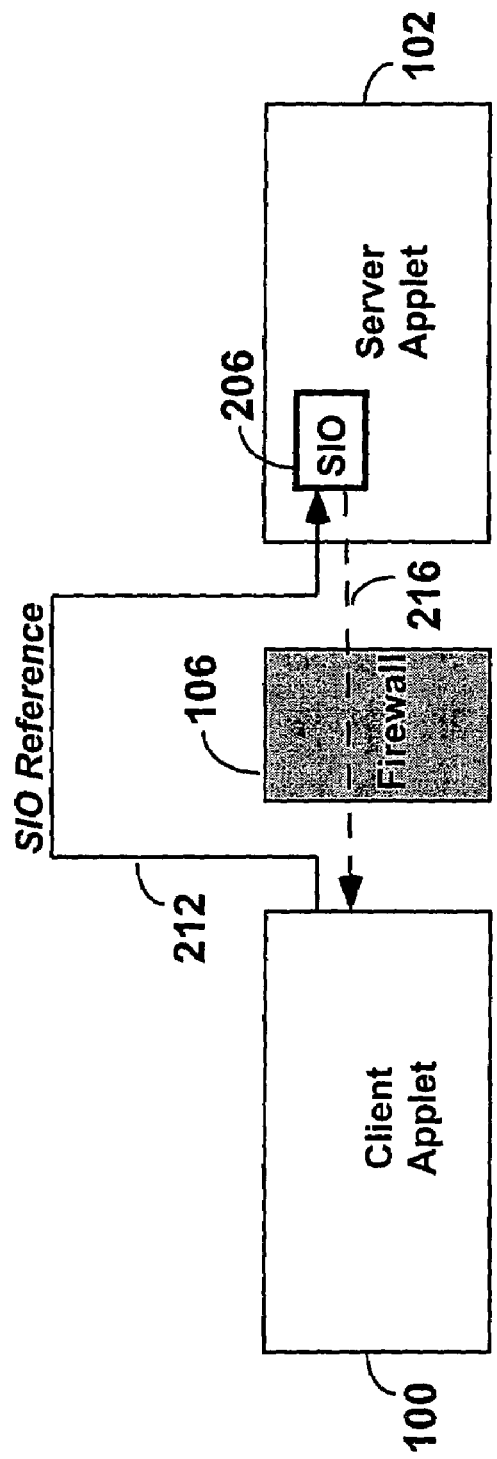

FIGS. 2a through 2e are a sequence illustrating a client applet 100 obtaining a reference to a server applet 102 using the Conventional Approach documented in the Java Card 2.1 specifications. In FIG. 2a, the server applet 102 registers 200 with the JCRE 108 upon installation. In FIG. 2b, when the client applet 100 is installed, it requests a shareable interface 202 from the JCRE 108 based on the desired server application identifier (AID). In FIG. 2c, the JCRE 108 forwards this request 204 to the server applet 102, along with the client AID. In FIG. 2d, based solely on the client AID, the server applet 102 responds by returning 208 to the JCRE 108 a reference to a shareable interface object (SIO) 206 if access is granted to the client, or null if access is not granted. The JCRE 108 forwards 210 the reference or null 208 to the client applet 100. In FIG. 2e, the client applet 100 may now use this SIO reference 212 to bypass the firewall 106 to access just the portion of the server applet 102 comprising the SIO 206. Note that the SIO 206 still cannot access 216 methods in the client applet 100; such access is still prevented by the firewall 106.

Note that the Conventional Approach of object sharing suffers from several aforementioned drawbacks, including the possibility of the server security being compromised by various means, and the difficulty of including within the server applet a list of every client AID that is permitted to gain access to the server, especially when such clients may be written after the server is deployed.

The present invention suffers from none of these drawbacks of the Conventional Approach. According to an embodiment of the invention a delegate approach is used to protect the underlying methods of the server and the client applications. Instead of granting a client application access to an interface of the server application, the client is given access to a delegate object. The delegate object controls access to the shared methods of the server application by enforcing a security policy, using security mechanisms. Thus the aforementioned technique of employing delegate objects enables introducing security mechanisms for object sharing. The security policy may include, but is not limited to, doing nothing, verifying common knowledge of a shared secret, hashing, and authenticating the client, e.g., through an AID, public-private key pairs (e.g., the RSA algorithm). The security policy may be through a preloaded means or via user interaction, e.g., by entering a PIN or other shared secret.

Figure 3A:
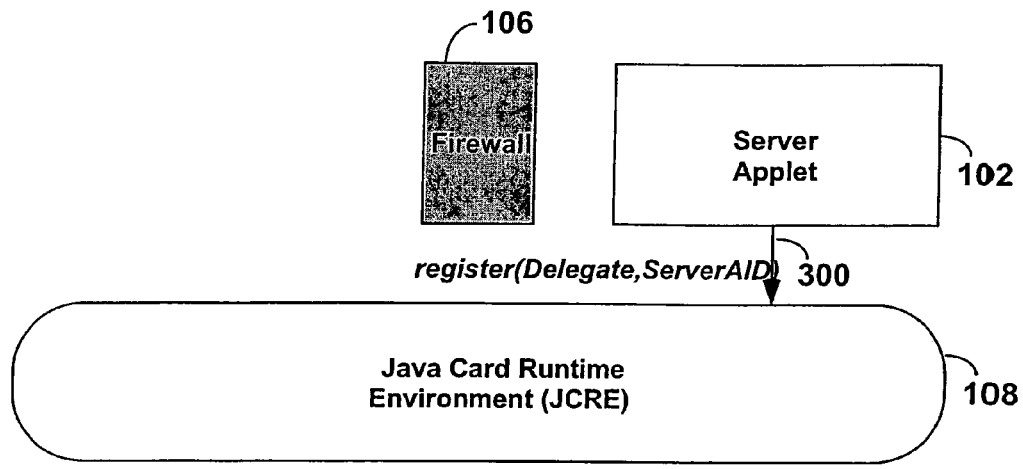
FIG. 3 is a series of block diagrams illustrating how object sharing through delegates is set up.
Figure 3B:
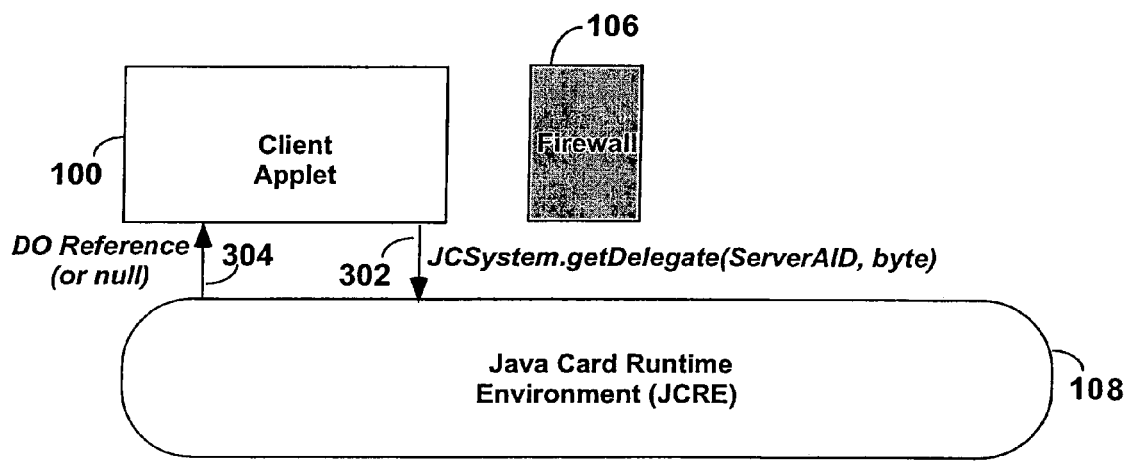

Obtaining a reference using the delegate approach is illustrated in FIGS. 3a through 3c. In FIG. 3a, the server applet 102 registers the delegate object (DO) associated with the server AID 300 with the JCRE 108 upon installation. In FIG. 3b, the client applet 100 requests the DO associated with a given server AID 302 from the JCRE 108, and obtains the DO reference 304 if it exists. Note that the DO reference will always be obtained if a server matching the requested AID has been installed; the server applet is not consulted upon this request, thus alleviating the need for the server to contain a list of acceptable client AIDs, which is a considerable drawback in the Conventional Approach. In FIG. 3c, the client applet 100 uses the DO reference 306 to bypass the firewall 106 and access the portion of the server applet 102 that comprises the DO 308. The server applet 102 is still prohibited from accessing 310 the client applet 100 due to the firewall 106.

However, this restriction can easily be avoided by having the client applet register a client delegate object which is obtained by the server applet. In fact, since the server applet does not have to contain a list of client AIDs, there is not a fundamental difference between a client applet and a server applet; any applet may freely obtain a delegate object registered by any other applet. The client may be thought of as whichever applet happens to be initiating a request for service at a particular time. Thus, two applets may have the relationship of being both a client and server to each other in various circumstances. Such an arrangement makes mutual authentication practical, which can lead to applets working together at a level of trust that is impractical with the Conventional Approach.

Figure 4:
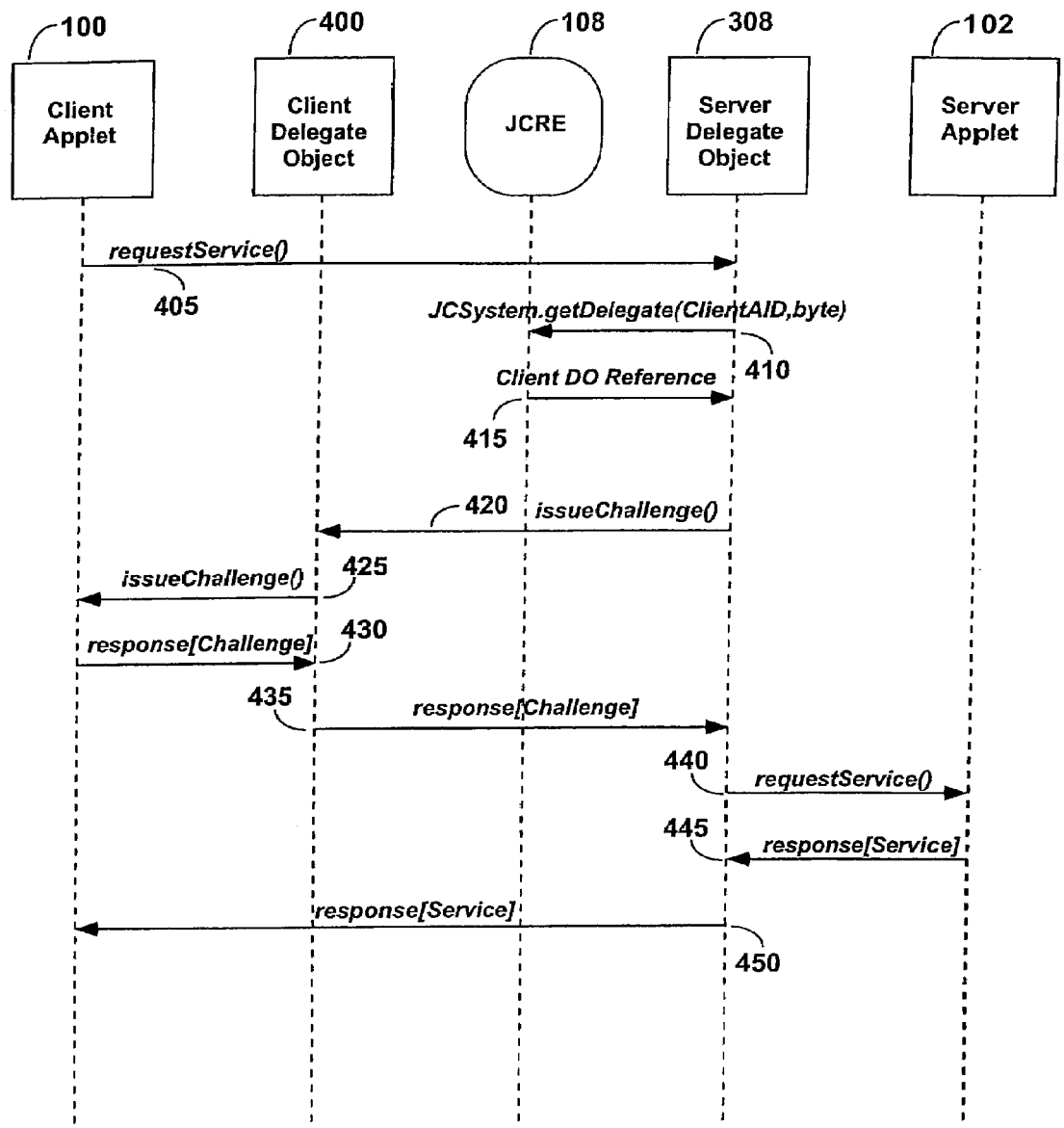
FIG. 4 is a message flow diagram that shows a series of messages used to securely access a delegate that is being protected by a challenge/response mechanism.

FIG. 4 is a message flow diagram that shows a series of messages used to securely access a method of a server applet that is being protected by a delegate using a challenge/response mechanism. The message flow diagram of FIG. 4 illustrates how trust may be established between applets using the delegate approach of the present invention. In this message flow diagram, the client applet 100 initiates a request for service 405 to the server delegate 308 (obtained using the process in FIG. 3). If this is the first reference from this particular client, then the server authenticates the client, to ensure that a malicious client is not requesting service. A valid client applet possesses a certain secret or may in some other way be authenticated; the server ensures that the client can demonstrate knowledge of the secret or conforms with whatever security policy the server is enforcing. The method below is described in the context of a shared secret. A person skilled in the art will be able to modify the method for implementing other security policies.

The server delegate 308 requests a reference 410 to the client delegate 400 from the JCRE 108, and receives the reference 415. The server delegate 308 issues a challenge 420 to the client delegate 400 to prove knowledge of the secret. The challenge is forwarded 425 to the client applet 100. The client applet 100 responds to the challenge in a way that demonstrates knowledge of the secret 430, and passes this response to the client delegate 400. The client delegate 400 passes the response 435 back to the server delegate 308. The server delegate 308 validates the response. If the response is correct, then the original request for service 405 is forwarded 440 to the server applet 102. The server applet 102 provides the requested service, and issues a response 445 which is passed to the server delegate 308. This response is passed back 450 to the client applet 100, thus completing the request for service.

Note that depending upon the security policy, as part of the response 445, the server may provide a session key to an authenticated client. Until the session key expires (usually when power is removed), the client may initiate subsequent requests that are processed using messages 405, 440, 445, and 450, bypassing the challenge/response portion of this sequence.

Note also that the authentication could have been easily performed in both directions if desired, in that the client could authenticate the server before trusting the server to process the request for service, using exactly this same process.

Figure 5:
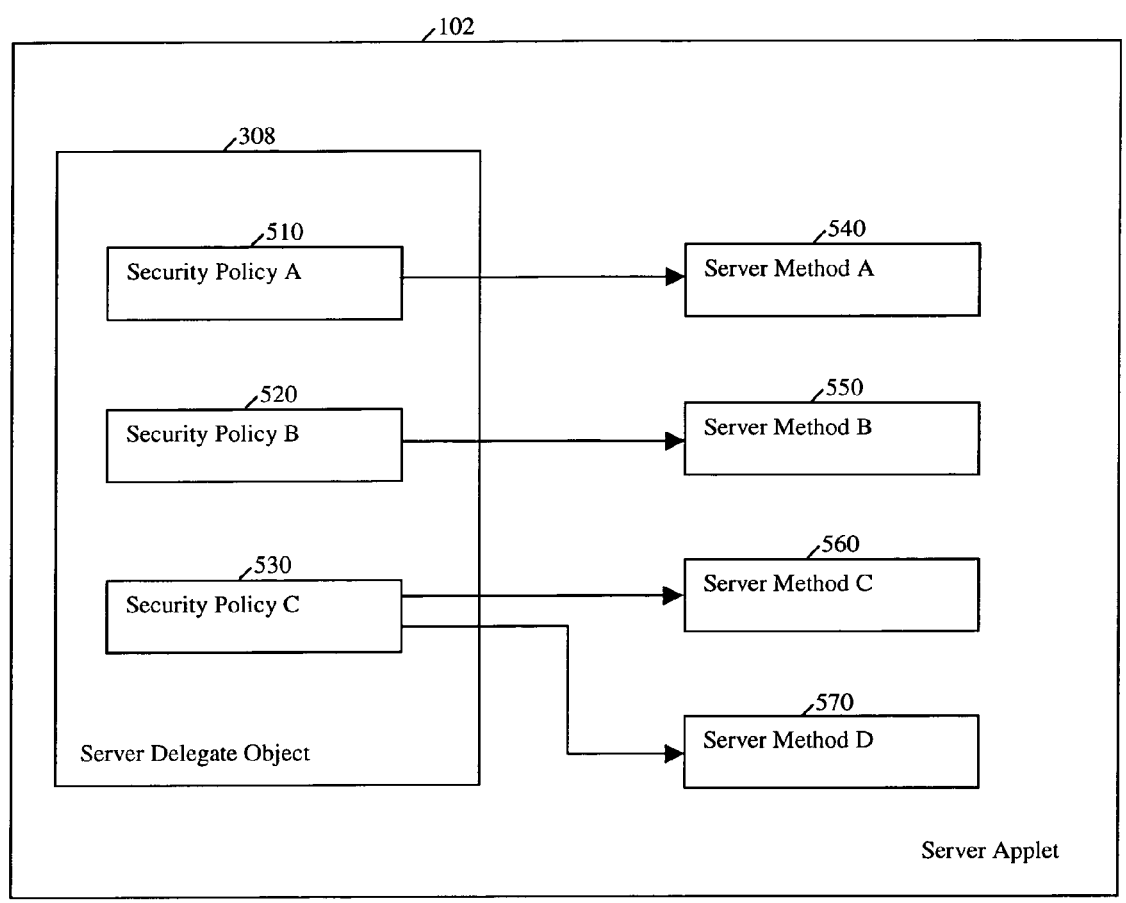
FIG. 5 is a block diagram of a server applet enforcing different security policies using a delegate.

FIG. 5 is a block diagram of a server applet 110 that enforces different security policies on various methods in the applet. The server applet 102 has a delegate object 308 which implements three different security policies for access to the server methods. Security policy A 510 permits unrestricted access to server method A 540, e.g., the getBalance method of an electronic purse server applet may permit any other applet to query the balance. Security policy B 520 restricts access to server method B 550 by means of a shared secret, e.g., the addPurse method has to demonstrate knowledge of a secret controlled by a certain bank before adding additional funds to the electronic purse. Security policy C 530 requires the user to demonstrate knowledge of a PIN before permitting access to server method C 560 or server method D 570, e.g., spendPurse or changeUserPIN. Thus each server method is protected by the appropriate security policy for that particular method.

Appendix B contains code for the preferred embodiment for delegates. Code 3 shows a server applet 102 registering its delegate 308. Code 4 illustrates the server delegate 308. Code 5 illustrates a simple challenge/response interface. Code 6 shows a client applet 100 invoking a server method. Code 7 illustrates a client delegate 400 for challenge/response.

While specific embodiments of the present invention have been described, various modifications and substitutions will become apparent to one skilled in the art by this disclosure. One example of such modification is to use proxies instead of delegates. Such modifications and substitutions are within the scope of the present invention, and are intended to be covered by the appended claims.

APPENDIX A

Compromising security of a SIO

```
package AppABC;
import javacard.framework.*;
public interface ABCLoyaltyAirlineInterface extends Shareable {
    public void grantFrequentFlyerPoints (int amount);
}
public interface ABCLoyaltyPurseInterface extends Shareable {
    public void grantLoyaltyPoints (int amount);
}
public class ABCLoyaltyApplet extends
    javacard.framework.Applet implements
    ABCLoyaltyAirlineInterface, ABCLoyaltyPurseInterface {
    protected int loyaltyPoints;
    protected int frequentFlyerPoints;
    /* A service only for client 'Airline' */
    public void grantFrequentFlyerPoints (int amount) {
        frequentFlyerPoints += amount;
    }
    /* A service only for client 'Purse' */
    public void grantLoyaltyPoints (int amount) {
        loyaltyPoints += amount;
    }
    public ABCLoyaltyApplet( ) throws Exception {
        loyaltyPoints = 0;
        frequentFlyerPoints = 0;
        /* Add code to initialize potential client AIDs . . . */
        register ( );
    }
    public void process( ) {
        /* Various code specific to services for this applet,
            such as point redemption code . . . */
    }
    public Shareable getShareableInterfaceObject (
                    AID clientAID, byte parameter) {
        if (clientAID.equals (purseAppletAID))
            return (ABCLoyaltyPurseInterface) this;
        else if (clientAID.equals (airlineAppletAID))
            return (ABCLoyaltyAirlineInterface) this;
        else
            return null;
    }
}
```
Code 1. Server defines and grants access to SIO
```
package AppPurse;
import javacard.framework.*;
import AppABC.*;
public class PurseApplet extends javacard.framework.Applet {
    private int value;
    private ABCLoyaltyPurseInterface abcSIO;
    public PurseApplet( ) throws Exception {
        value = 0;
        abcSIO = (ABCLoyaltyPurseInterface)
            JCSystem.getAppletSharableInterfaceObject (
                abcLoyaltyAppletAID, (byte) 0);
        register ( );
    }
    public void use (int amount) {
        value -= amount;
        if (abcSIO != null)
            abcSIO.grantLoyaltyPoints (amount);
        /* Attempt to 'hack' by using an SIO to access the Airline
         * applet's exclusive service grantFrequentFlyerPoints */
        ABCLoyaltyAirlineInterface hackSIO =
            (ABCLoyaltyAirlineInterface)
            JCSystem.getAppletSharableInterfaceObject (
                ABCLoyaltyAppletAID, (byte) 0);
        if (hackSIO != null)
            hackSIO.grantFrequentFlyerPoints (amount);
    }
    /* Other methods follow for adding points to the purse . . . */
}
```
Code 2. Client compromises SIO

APPENDIX B

Secure Delegate Implementation Of Object Sharing

```
package AppABC;
import OSResources.*;
public class ABCLoyaltyApplet extends OSResources.Applet {
private String aid = AppABC.ABCLoyaltyApplet;
private int loyalty;
public ABCLoyaltyApplet( ) {
        loyalty = 0;
        register (new ABCLoyaltyDelegate (this), aid);
    }
    void grantPoints (int amount) {
        loyalty += amount;
    }
    boolean usePoints (int amount) {
        if (loyalty >= amount) {
            loyalty -= amount;
            return true;
        } else {
            return false;
        }
    }
    int readPoints ( ) {
        return loyalty;
    }
}
Code 3. Server applet registering its delegate
package AppABC;
import OSResources.*;
public class ABCLoyaltyDelegate extends Delegate {
    final static byte CHALLENGE_LENGTH = (byte) 64;
    final static byte FAILURES_ALLOWED = (byte) 2;
    private byte[ ] secret1 = {/* initializing code . . . */};
    private byte[ ] secret2 = {/* initializing code . . . */};
    private ABCLoyaltyApplet myApplet;
    private ChallengePhrase cp;
    private ChallengePhrase checkcp;
    private byte grantTriesRemaining = FAILURES_ALLOWED;
    private byte useTriesRemaining = FAILURES_ALLOWED;
    protected ABCLoyaltyDelegate (ABCLoyaltyApplet a) {
        myApplet = a;
        cp = new ChallengePhrase (CHALLENGE_LENGTH);
        checkcp = new ChallengePhrase (CHALLENGE_LENGTH);
    }
    public boolean grantPoints (int amount) {
        // do some checking
        if (myApplet != null) {
            ABCLoyaltyInterface pD = (ABCLoyaltyInterface)
                OSystem.getDelegate (
                    OSystem.getPreviousContextAID ( ));
            if (pD != null) {
                /* Create new random challenge phrase */
                checkcp.setPhrase(cp.randomize ( ));
                /* Get client response to phrase */
                byte[ ] response = pD.loyaltyChallenge (cp);
                byte[ ] r = checkcp.encrypt (secret1);
                if (isEqual (response, r)) {
                    /* See if client gave the correct response */
                    grantTriesRemaining = FAILURES_ALLOWED;
                    myApplet.grantPoints (amount);
                    return true;
                } else {
                    if (--grantTriesRemaining == 0) myApplet = null;
                    return false;
                }
            }
        }
        return false;
    }
    public boolean usePoints (int amount) {
    /* Access to this method uses secret2, for different
        clients, but is otherwise similiar to grantPoints . . . */
    }
```

APPENDIX B-continued

Secure Delegate Implementation Of Object Sharing

```
    public int readPoints ( ) {
        if (myApplet != null) return myApplet.readPoints( );
        else return 0;
    }
}
Code 4. Server delegate
package AppABC;
import OSResources.*;
public interface ABCLoyaltyInterface {
public byte[ ] loyaltyChallenge (ChallengePhrase cp);
}
Code 5. Server defines interface that each client must
provide to handle challenge/response
package AppPurse;
import OSResources.*;
import AppABC.*;
public class PurseApplet extends OSResources.Applet {
    public String aid ="AppPurse.PurseApplet";
    private byte[ ] secret1 = {/* initializing code . . . */ };
    private int value;
    public PurseApplet ( ) {
        value = 0;
        register (new PurseDelegate(this), aid);
    }
    public byte[ ] loyaltyChallenge (ChallengePhrase cp) {
        return cp.encrypt (secret1);
    }
    public void use (int amount) {
        value -= amount;
        ABCLoyaltyDelegate d =
            (ABCLoyaltyDelegate)
            OSystem.getDelegate ("AppABC.ABCLoyaltyApplet");
        if (d != null) {
            d.grantPoints (amount);
        }
    }
    /* Other methods follow for adding points to the purse . . . */
}
Code 6. Client applet invoking server method
package AppPurse;
import OSResources.*;
import AppABC.*;
public class PurseDelegate extends Delegate implements
ABCLoyaltyInterface {
    private PurseApplet myApplet;
    protected PurseDelegate (PurseApplet a) {
        myApplet = a;
    }
    public byte[ ] loyaltyChallenge (ChallengePhrase cp) {
        if (myApplet != null)
            return (myApplet.loyaltyChallenge (cp));
        else
            return null;
    }
}
Code 7. Client challenge/response delegate
```

What is claimed is:

1. A method of operating a secure multi-application microcontroller to allow a first application executing on said secure multi-application microcontroller to secure access to methods or data of a second application also executing on said secure multi-application microcontroller wherein the second application is an object-oriented program having at least one object, the microcontroller having an operating system, the method comprising:
the second application registering a delegate object on the microcontroller with the operating system, wherein the delegate object comprises executable code for enforcing a desired security policy associated with a first method of the at least one object of the second application;

the first application calling upon the delegate object to obtain access to the first method of the second application; and protecting access to the first method of the second application by executing the executable code for enforcing a security policy of the delegate object.

2. The method of claim 1, wherein the security policy is selected from the set consisting of knowledge of a shared secret, doing nothing, hashing, public-private key pairs, and specific Application ID.

3. The method of claim 1, further comprising:
the first application requesting from the operating system a reference to the delegate associated with the second application; and
the operating system ret to the first application a reference to the delegate.

4. The method of claim 2, further comprising:
the first application requesting services from the second application by sending a message to the delegate; and
the delegate enforcing a desired security policy and forwarding the request to the second application if the security policy is satisfied.

5. A microcontroller having an operating system for executing multiple application programs, the microcontroller comprising:
a first logic means for allowing an object-oriented server application program, executing on the microcontroller and having at least one object, to register a delegate object, wherein the delegate object includes a second logic means of executable code for enforcing a security policy with respect to other application programs executing on the microcontroller and seeking access to the at least one object.

6. The microcontroller of claim 5, further comprising:
a third logic means for receiving a request from a client application executing on the microcontroller and for forwarding the request to the delegate object, wherein the delegate object includes a fourth logic means of executable code for responding to the request if the security policy is satisfied.

7. The microcontroller of claim 6 wherein the security policy is selected from the set consisting of knowledge of a shared secret, doing nothing, hashing, public-private key pairs, and specific Application ID.

8. The method of claim 1 wherein the secure multi-application microcontroller executes both the first and second applications.

9. A method of operating a secure multi-application microcontroller to allow a first application executing on the microcontroller secure access to methods or data of a second application also executing on the microcontroller wherein the second application is an object-oriented program having at least one object, the method comprising:
registering a delegate object with an operating system executing on the microcontroller, wherein the delegate object corresponds to the second application;
the first application sending a request message to the delegate object;
the delegate executing a challenge/response mechanism to authenticate the first application issuing a challenge to the first application;
the first application responding to the challenge;
the delegate object validating the response; and
if the response is correct, forwarding the request message to the second application.

10. The method of claim 9, farther comprising
sending the issuing challenge to a second delegate object, wherein the second delegate object corresponds to the first application; and
operating the second delegate object to forward the challenge to the first application.

11. The method of claim 9, wherein the response to the challenge confirms that the first application knows a shared secret.

12. The method of claim 9, wherein the second application comprises a plurality of methods, and the delegate object enforces security policies particular to each of the plurality of methods.

13. The method of claim 12, wherein the particular security policy for any one of the plurality of methods is selected from the set consisting of doing nothing, verifying common knowledge of a shared secret, hashing, authenticating the client, and public-private key pairs.

14. The method of claim 9, wherein the delegate object enforces a security policy of at least one method of the second application and wherein the security policy is selected from the set consisting of doing nothing, verifying common knowledge of a shared secret, hashing, authenticating the client, and public-private key pairs.

15. The method of claim 9, wherein the first application and second application are executed on the same microcontroller.

* * * * *